3,175,878
METHOD OF CARBONATE LEACHING URANIUM ORES
John C. Hillyer, Bartlesville, Okla., assignor to Phillips Petroleum Company, a corporation of Delaware
No Drawing. Filed Feb. 24, 1960, Ser. No. 10,540
2 Claims. (Cl. 23—14.5)

This invention relates to an improved process for recovering uranium values from uranium-containing ores. In one aspect, it relates to an improved process for recovering uranium values by accelerating the rate of carbonate leaching of the uranium-containing ores.

Uranium is currently being produced in commercial quantities from uranium-containing ores such as uraninite, coffinite, carnotite and the like. Such ores, usually containing from 0.1 to 0.5 weight percent $U_3O_8$ are processed by various hydrometallurgy procedures to obtain uranium-containing concentrates. These ores contain generally at least 25 percent, and more often at least 50 percent, of their uranium values in the tetravalent state.

The first step in producing a uranium-containing concentrate is to dissolve the $U_3O_8$ from the ore. Two widely used methods for effecting this dissolution are carbonate leaching and acid leaching. Hereinafter, I shall limit my discussion to carbonate leaching processes.

Since most of the above disclosed ores contain uranium in a subhexavalent state, it is necessary to oxidize the uranium to the hexavalent state during leaching since the subhexavalent compounds such as $UO_2$ are insoluble. While the leaching of hexavalent uranium values occurs very rapidly, the oxidation of tetravalent values to hexavalent values and subsequent leaching requires a rather long reaction time. To provide the necessary reaction time, a series of reaction vessels are employed. A widely used leaching vessel, which is operated at substantially atmospheric pressure, is referred to as a Pachuca.

In the leaching of uranium ores, containing a portion of the uranium values in the tetravalent state, and using a series of reaction vessels operating at atmospheric pressure, problems are encountered which are common to all continuous processes involving a number of reactors in series. For example, a slurry of uranium ore in carbonate leach liquor is charged to the first Pachuca continuously, and the discharge from this Pachuca is passed continuously into the second Pachuca and so on. Since the total residence time for essentially complete extraction of uranium values in a carbonate leaching process is usually about 50 hours, the normal residence time in each one of these Pachucas is on the order of from 7 to 10 hours, depending upon the number of Pachucas arranged in series. While the average retention time in each Pachuca is set for the desired leach in that vessel, some of the ore is not leached sufficiently in that vessel while the remainder, or at least a portion of the remainder, remains in that vessel longer than the average retention time. In the first stages of leaching, some of the ore thus passes through one or even several Pachucas with insufficient leaching time, and thereby affects the overall recovery of uranium from the ore. It would thus be very desirable if the rate of uranium leaching could be accelerated.

It is an object of this invention to provide a process for leaching uranium-containing ores by a carbonate leach process wherein the rate of leaching is accelerated.

It is a further object of this invention to provide an improved process for the leaching of uranium ores wherein at least a portion of the uranium values are present in the tetravalent state.

This, and other objects of this invention will become more readily apparent from the following detailed description and discussion.

I have now discovered that the carbonate leaching of uranium containing ores wherein at least a portion of the uranium is present in the tetra valent state, can be accelerated by the addition of a surfactant to the leach mixture.

Surfactant as used herein is intended to include those synthetic surface active agents which contain a hydrophobic and hydrophilic group. Surfactants which can be employed in the process of this invention can be of the anionic, cationic, and non-ionic types. Some examples of types of surfactants within these groups which can be employed are alkyl aryl sulfonates, sulfates and sulfonated esters and ethers, amine salts, fluorinated esters of long chain acids, and the condensation products of alkylene oxides with alkylated phenols. Some specific examples of surfactants within these types are cetylpyridinium bromide, the high molecular weight condensation products of ethylene oxide with alkylated phenols in which the alkyl groups contain from 8 to 20 carbon atoms, fluorinated esters of acyclic carboxylic acid containing from 8 to 20 carbon atoms, alkyl naphthalene sulfonic acids in which one or more alkyl groups can contain a total of from 1 to 10 carbon atoms, including the alkali metal salts of these sulfonic acids, the sulfonated esters of dicarboxylic acids such as di(2-ethylhexyl)sodium sulfosuccinate and the like.

In practicing the process of this invention the tetravalent uranium-containing ore charged to the leaching vessel should be ground at least as fine as 25 mesh and preferably to at least 40 mesh. Prior to grinding, the ore is admixed with a recycled carbonate leach solution containing from 25 to 60 grams per liter of $Na_2CO_3$ and 2 to 20 grams per liter of $NaHCO_3$. The mixture can contain from 5 to 65 percent by weight of ore. Surfactant is added to the leach mixture so as to maintain in the recycled leach solution a concentration between 0.5 and 100 pounds of surfactant per ton of the uranium-containing ore with a preferred range of 0.5 to 60 pounds per ton of ore. After the ore has been disintegrated the resulting slurry comprised of disintegrated ore and leach solution is passed to a leaching zone.

The leaching process of this invention can be carried out at a temperature of from 80 to 110° C., although temperatures above 100° C. will require the use of pressure vessels to prevent evaporation. The residence time for the leaching step will normally be between 2 and 60 hours. Preferably, a series of leaching vessels is used to give the required residence time with the discharge from the first vessel continuously passing to a second leaching vessel, a second leaching vessel continuously discharging to a third vessel and succeeding vessels in like manner until the leaching operation is substantially complete.

To insure the oxidation of subhexavalent uranium to hexavalent uranium, air is passed into each leaching vessel at a rate of at least 0.5 liter per hour per kilogram of ore, preferably above 1.0. It is within the scope of this invention to employ oxygen, ozone and the like in place of, or in addition to the air, in which case the air rate can be reduced by a proportionate amount. Furthermore, supplementary oxidants such as potassium permanganate, manganese dioxide, and the like can be utilized.

Following the leaching process, conventional methods may be employed to effect the final recovery of the uranium values. The undissolved solids can be separated from the leach slurry containing dissolved uranium values by filtration, flocculation and the like. The remaining filtrate, containing dissolved sodium uranyl tricarbonate, is commonly referred to as pregnant carbonate leach liquor.

I have discovered that the use of a surfactant in a leaching step also aids in subsequent filtration and flocculation. The reason for such effects is not known, but definite improvements in flocculation and filtration have been noted.

The pregnant carbonate leach solution containing dissolved uranium values can then be treated to recover the uranium by such means as extraction, ion exchange, and precipiation. The preferred procedure for recovering uranium values from carbonate leach solutions is to add an excess of sodium hydroxide thus causing the uranium values to be precipitated as sodium diuranate, commonly referred to as yellow cake. The solution from which the uranium has been precipitated is called barren liquor and can be recarbonated and recycled to be admixed with ore prior to grinding said ore, or it may be recycled directly to the leaching zone. It has been observed that the presence of a surfactant aids in disintegrating the uranium ore.

The surfactant employed during the leaching process is substantially recovered and recycled with the barren liquor from the precipitation step to the leaching vessels thus to be used again. The importance of this recovery operation from the standpoint of economy is readily apparent. It permits high concentration of surfactants to be used thereby greatly accelerating the rate of leaching, yet only small additions of surfactant makeup are required to maintain a high surfactant concentration.

The following specific examples are intended to illustrate the improvements which can be realized by operating according to the inventive process. However, it is not intended that my invention should be limited to the specific examples shown.

EXAMPLE I

A number of runs were carried out where several coffinite ores were leached with carbonate leach liquor in the presence of various surfactants. The surfactants employed were as follows:

| Run | Surfactant |
|---|---|
| 1 | Cetylpyridinium bromide. |
| 2 | Condensation product of 30 mols ethylene oxide with 1 mol nonylphenol. |
| 3 | Mixture of ammonium salts of perfluorinated aliphatic acids, principally perfluoro caprylic acid. |
| 4 | Sodium salt of methylnaphthalene-sulfonic acid. |

In these runs 1000 grams of ore, a surfactant and an amount of carbonate leach liquor sufficient to provide a slurry of 45–50 percent solids were changed to a flask fitted with a stirrer, heater and an air inlet tube. The ore in each run was ground to at least 48 mesh and the carbonate leach liquor contained 50 grams per liter of $Na_2CO_3$ and 15 grams per liter of $NaHCO_3$. Each ore was leached for 66 hours at 90° C. and during each run, 1.31 liters of air per hour per kilogram of ore was bubbled through the mixture.

During leaching, samples from each run were intermittently drawn off and filtered to remove solids. The $U_3O_8$ content of the filtrate was then determined by X-ray spectroscopy. The results of these runs are expressed in Table I.

Table I

| Run | Lbs. Surfactant Per Ton of Ore | Wt. Percent $U_3O_8$ in Ore | Wt. Percent $U_3O_8$ Extracted from Ore | | | | | |
|---|---|---|---|---|---|---|---|---|
| | | | 1 Hr. | 2 Hrs. | 7 Hrs. | 18 Hrs. | 42 Hrs. | 65 Hrs. |
| 1 | 2 | 0.13 | | | | 90.80 | 90.80 | 96.10 |
| 1A [1] | 0 | 0.13 | | | | 69.76 | 70.45 | 94.62 |
| 2 | 57 | 0.13 | | 95.38 | 95.38 | 95.38 | 95.38 | 95.38 |
| 2A [1] | 0 | 0.13 | | | | 69.76 | 70.45 | 94.62 |
| 3 | 1 | 0.49 | 43.43 | 55.64 | 69.56 | 86.36 | 92.29 | 96.53 |
| 3A [1] | 0 | 0.49 | 36.24 | 42.70 | 60.35 | 76.27 | 86.19 | 96.12 |
| 4 | 1 | 0.19 | 70.81 | 77.58 | 93.20 | 95.80 | 95.80 | 96.32 |
| 4A [1] | 0 | 0.19 | 62.00 | 71.73 | 84.54 | 93.77 | 93.77 | 91.36 |

[1] Runs 1A, 2A, 3A, and 4A were control runs made for comparison purposes.

Table I clearly demonstrates the value of surfactants in accelerating the leaching process. By comparing runs 1 and 2, it is readily apparent that the acceleration of the leaching process is proportional to the amount of surfactant used. Runs 2 and 2A illustrate that the time required to obtain 95 percent recovery can be reduced from 65 to 2 hours. Runs 4 and 4A illustrate that the time required to obtain approximately 93 percent recovery is reduced from 18 to 7 hours using only 1 pound of surfactant per ton of ore.

EXAMPLE II 1000 tons per day of coffinite ore containing 0.25 weight percent of $U_3O_8$ is charged to a leaching unit. Simultaneously, 1070 tons per day of carbonate leach liquor containing 37.2 grams per liter $Na_2CO_3$ and 10.0 grams per liter $NaHCO_3$ is charged to the leaching unit. The combined charge contains 46 weight percent solids and has a specific gravity of 1.528. Thus, the combined flow to the leaching unit is 237 gallons per minute. At the start-up of the unit, a non-ionic surfactant (12-(nonylphenyl)-3,6,9,12-tetraoxadodecanol) is charged at the rate of 50 pounds per ton of ore and is continued at this rate until recycled carbonated leach solution containing initially charged surfactant reaches the leaching unit. The charging rate of the surfactant is then decreased to six pounds per ton of ore which is the amount required as makeup for the surfactant lost in mill solution passing to the tailings pond.

In the leaching unit comprised of 7 Pachucas, each Pachuca is maintained at 200° F. When 50 pounds per ton of ore of surfactant is employed, 95 percent of the $U_3O_8$ in the ore is leached in 2.5 hours, while in the absence of the surfactant, 50 hours are required for the same leaching efficiency.

This example clearly demonstrates the value of using relatively high concentrations of surfactant when an efficient recovery and recycling process for recovering the surfactant is employed.

As will be evident to those skilled in the art, various modifications of this invention can be made, or followed, in the light of the foregoing disclosure and discussion, without departing from the spirit or scope thereof.

I claim:

1. A process of leaching uranium values from a uranium-containing ore which comprises contacting a uranium-containing ore having a maximum particle size of 25 mesh with a carbonate leach solution containing from 25 to 60 grams per liter of $Na_2CO_3$ and 2 to 20 grams per liter of $NaHCO_3$ in a leaching zone, said ore containing at least a portion of said values in a tetravalent state, the leaching mixture containing from 5 to 65 percent by weight of ore, admixing therewith cetylpyridinium bromide in the amount of 0.5 to 60 pounds per ton of ore, passing air into the admixture, recovering from said leaching zone a leach solution containing dissolved uranium values, and separating from said leaching solution undissolved solids.

2. A process of leaching uranium values from a uranium-containing ore which comprises contacting a uranium-containing ore having a maximum particle size of 25 mesh with a carbonate leach solution containing from 25 to 60 grams per liter of $Na_2CO_3$ and 2 to 20 grams per liter of $NaHCO_3$ in a leaching zone, said ore containing at least a portion of said values in a tetravalent state, the leaching mixture containing from 5 to 65 percent by weight of ore, admixing therewith fluorinated octanoate in an amount of 0.5 to 60 pounds per ton of ore, passing air into the admixture, recovering from said leaching zone a leach solution containing dissolved uranium values, and separating from said leaching solution undissolved solids.

References Cited by the Examiner

UNITED STATES PATENTS

| | | |
|---|---|---|
| 2,697,518 | 12/54 | Bennet. |
| 2,878,100 | 3/59 | Googin _____ 23—14.5 |
| 2,905,552 | 9/59 | Holden. |

OTHER REFERENCES

AEC Document ACCO–36, pages 14–18, 30–32, Oct. 15, 1953.

Proceedings of International Conference on Peaceful Uses of Atomic Energy, vol. 8, pp. 12, 42 (1955).

WIN–67, pp. 8, 15, 22, Feb. 15, 1957.

Clegg et al.: "Uranium Ore Processing," pages 156–163, 314, 315, 318–321, Addison-Wesley Publication Co., Reading, Mass., 1958.

CARL D. QUARFORTH, *Primary Examiner.*

ROGER L. CAMPBELL, *Examiner.*